United States Patent [19]

Hou

[11] Patent Number: 4,864,879
[45] Date of Patent: Sep. 12, 1989

[54] APPARATUS FOR IMPARTING OSCILLATORY MOVEMENTS TO PLURAL ORNAMENTS OF AN ORNAMENTAL ASSEMBLY

[76] Inventor: Jack Hou, 4F. No. 14, Lane 5, Alley 265, Sec. 4, Hsin Yi Rd., Taipei, Taiwan

[21] Appl. No.: 204,511

[22] Filed: Jun. 9, 1988

[51] Int. Cl.$^4$ ............................................. F16H 21/18
[52] U.S. Cl. ........................................ 74/50; 446/118; 446/352
[58] Field of Search .................. 74/49, 50, 65; 446/91, 446/118, 330, 352; 272/28 R, 28 S, 31 R

[56] References Cited

U.S. PATENT DOCUMENTS

| | | | |
|---|---|---|---|
| 51,029 | 11/1865 | Ellinwood | 74/49 |
| 546,912 | 10/1895 | Boettcher | 272/31 R X |
| 731,309 | 6/1903 | Kilbourn | 446/118 |
| 947,233 | 1/1910 | Hammond | 74/49 |
| 1,358,768 | 7/1920 | Maisano | 272/31 R |
| 1,360,659 | 8/1920 | Maisano | 272/31 R |
| 1,517,168 | 11/1924 | Rogers | 74/50 |
| 1,635,108 | 1/1927 | Bluthardt | 272/31 R X |
| 2,301,967 | 11/1942 | Nosker et al. | 74/50 |
| 2,404,470 | 7/1946 | Zemen | 74/50 |
| 3,125,826 | 5/1964 | Ostrander | 446/301 |
| 3,191,930 | 6/1965 | Cottrell et al. | 272/31 R |
| 3,279,793 | 11/1966 | Lakin | 272/31 R |
| 3,398,588 | 8/1968 | Meier | 74/50 |
| 3,477,169 | 8/1969 | Gardel et al. | 446/301 |
| 3,498,603 | 2/1970 | Lakin | 272/31 R |
| 4,050,342 | 6/1977 | Suzuki et al. | 446/298 X |
| 4,052,898 | 11/1977 | Miller et al. | 72/214 |
| 4,272,996 | 6/1981 | Sauerwein | 74/50 |
| 4,289,040 | 9/1981 | Haluko, Jr. | 74/50 |
| 4,507,095 | 3/1985 | Lin | 446/118 |
| 4,708,689 | 9/1987 | Hou | 446/301 |

FOREIGN PATENT DOCUMENTS

| | | | |
|---|---|---|---|
| 254835 | 8/1945 | Switzerland | 446/118 |
| 298766 | 2/1954 | Switzerland | |
| 202983 | 11/1924 | United Kingdom | 446/91 |

Primary Examiner—Leslie A. Braun
Assistant Examiner—Janice E. Chartoff
Attorney, Agent, or Firm—Bacon & Thomas

[57] ABSTRACT

Oscillatory movements are imparted to plural ornaments of an ornamental assembly from the rotary output drive shafts of a power drive source through a cam assembly driven by each output shaft and connected to plural tappet rods on which the ornaments are supported. Numerous orientations of the tappet rods may be realized to accommodate different positions of the ornaments by detachably securing U-shaped, rectangular-shaped and L-shaped blocks to a casing for rotatably supporting the tappet rods in the different orientations.

10 Claims, 4 Drawing Sheets

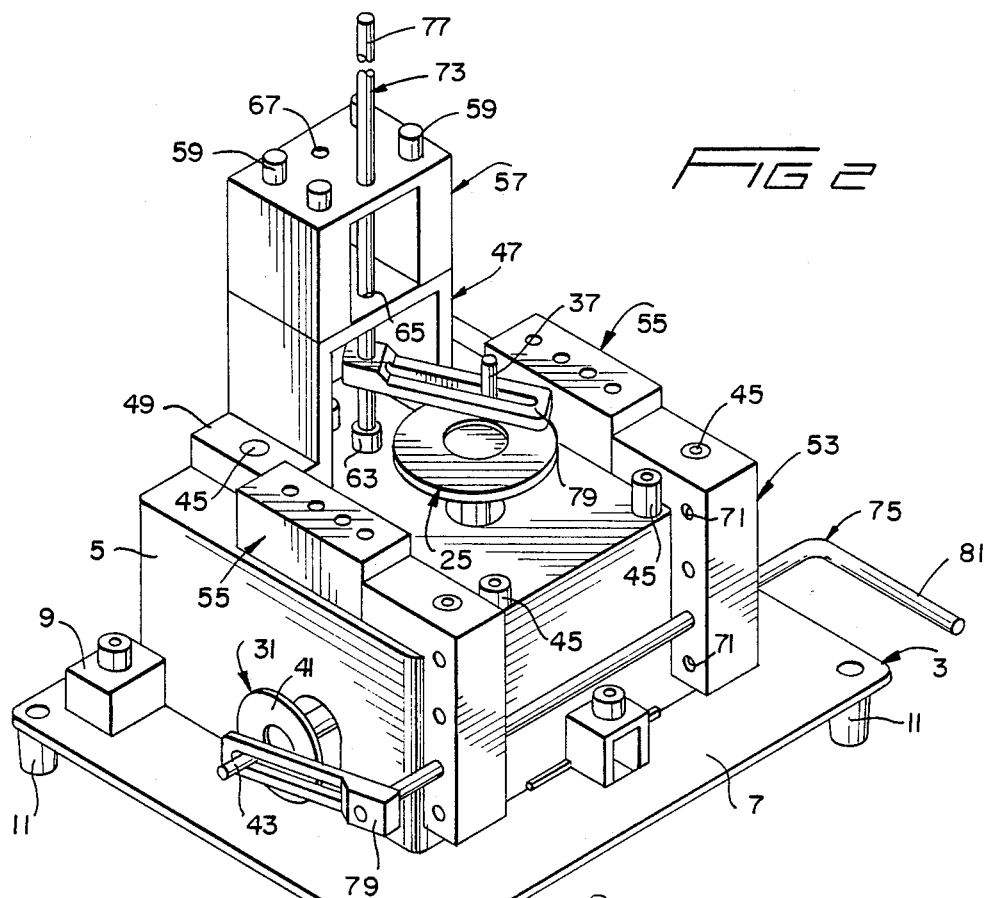
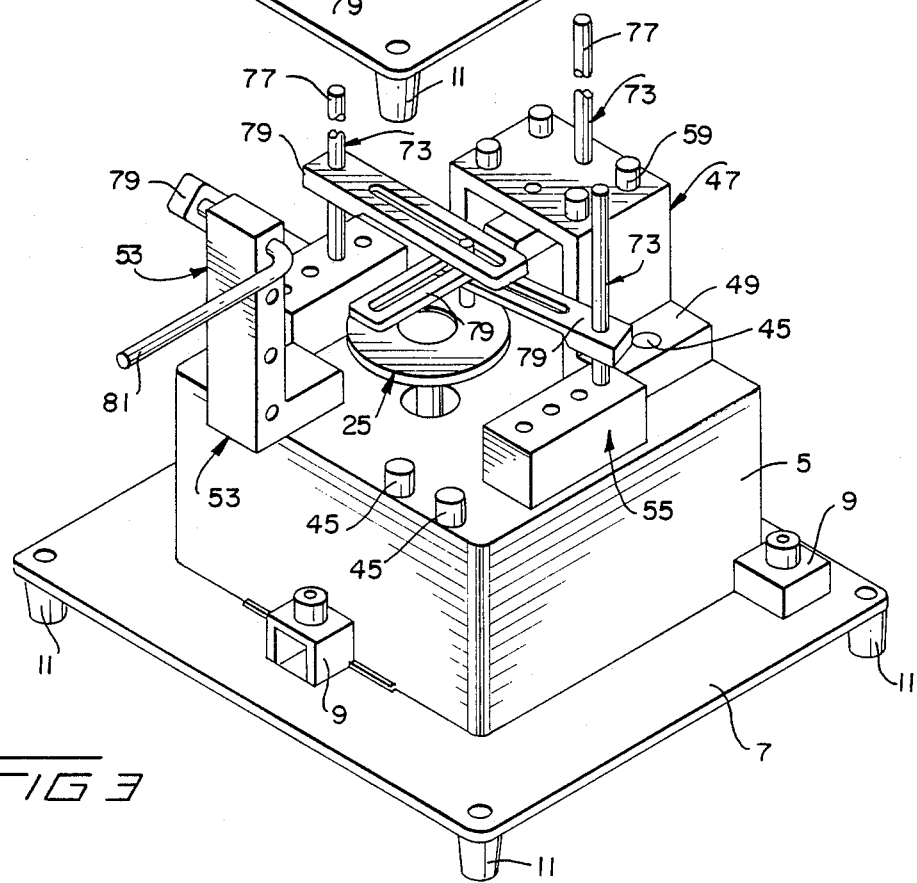

APPARATUS FOR IMPARTING OSCILLATORY MOVEMENTS TO PLURAL ORNAMENTS OF AN ORNAMENTAL ASSEMBLY

BACKGROUND OF THE INVENTION

1. Field of the Invention

The present invention generally involves the field of technology pertaining to animated ornamental Figures, such as animals, dolls, and the like. More specifically, the invention relates to an improved means for imparting movement to an ornament by a power drive source, particularly, wherein a single power source is used to move plural ornaments.

2. Description of the Prior Art

It is conventionally well known to impart movement to an ornamental FIGURE by means of an appropriate power source, such as an electrically driven motor or a mechanically driven wind-up music box. The means for converting the rotary movement of the output shaft of the power source to a reciprocating or oscillating movement that is subsequently imparted to the ornament usually requires the use of appropriate gearing and associated linkages. Conventional devices of this type are generally restricted to the animation of one ornament when a single power drive source is utilized. Such devices are generally incapable of utilizing a single power drive source for imparting different movements to a plurality of ornaments, particularly when the ornaments are all part of a unitary display assembly.

SUMMARY OF THE INVENTION

It is an object of the present invention to provide an improved mechanism for imparting movement to a power driven ornament.

It is another object of the invention to provide an apparatus through which a single power drive source may be used to simultaneously impart different movements to a plurality of ornaments.

It is a further object of the invention to provide an apparatus for imparting different movements to a plurality of ornaments wherein the apparatus may be readily changed to accommodate different ornament positions and movements.

It is yet another object of the invention to provide an improved mechanism for imparting movement to one or more ornaments wherein the mechanism is simple in construction and economical to manufacture.

These and other objects of the invention are realized by providing an apparatus that essentially comprises a housing defined by a rectangular casing and an associated base for supporting and enclosing a power drive source having at least one rotary power output shaft for rotating a cam assembly disposed exteriorly of the casing. The casing is provided with rectangular-shaped, U-shaped and L-shaped blocks which may be detachably secured to the casing by means of stubs carried by the casing which engage corresponding passageways formed in the blocks. The blocks permit selectively supporting a tappet rod in one or plural possible positions, wherein in each position the tappet rod is driven by the cam assembly through a cam follower arm carried by the rod. Rotation of the output shaft is thereby converted into an oscillatory motion of the rod, which in turn imparts a corresponding oscillating movement to an ornament attached to the rod. The blocks and rods may be rearranged in a multitude of positions and configurations to accommodate and impart different movements to plural ornaments.

Other objects, features and advantages of the invention shall become apparent from the following detailed description of preferred embodiments thereof when taken in conjunction with the drawings wherein like reference characters refer to corresponding parts of the several views.

BRIEF DESCRIPTION OF THE DRAWINGS

FIG. 2 is a perspective view of one possible assembled configuration of the apparatus of FIG. 1 wherein a single straight tappet rod and a single L-shaped tappet rod are used.

FIG. 3 is a perspective view of another possible assembled configuration of the apparatus of FIG. 1 wherein three straight tappet rods and a single L-shaped tappet are used.

DETAILED DESCRIPTION OF THE PREFERRED EMBODIMENTS

Figure 1:
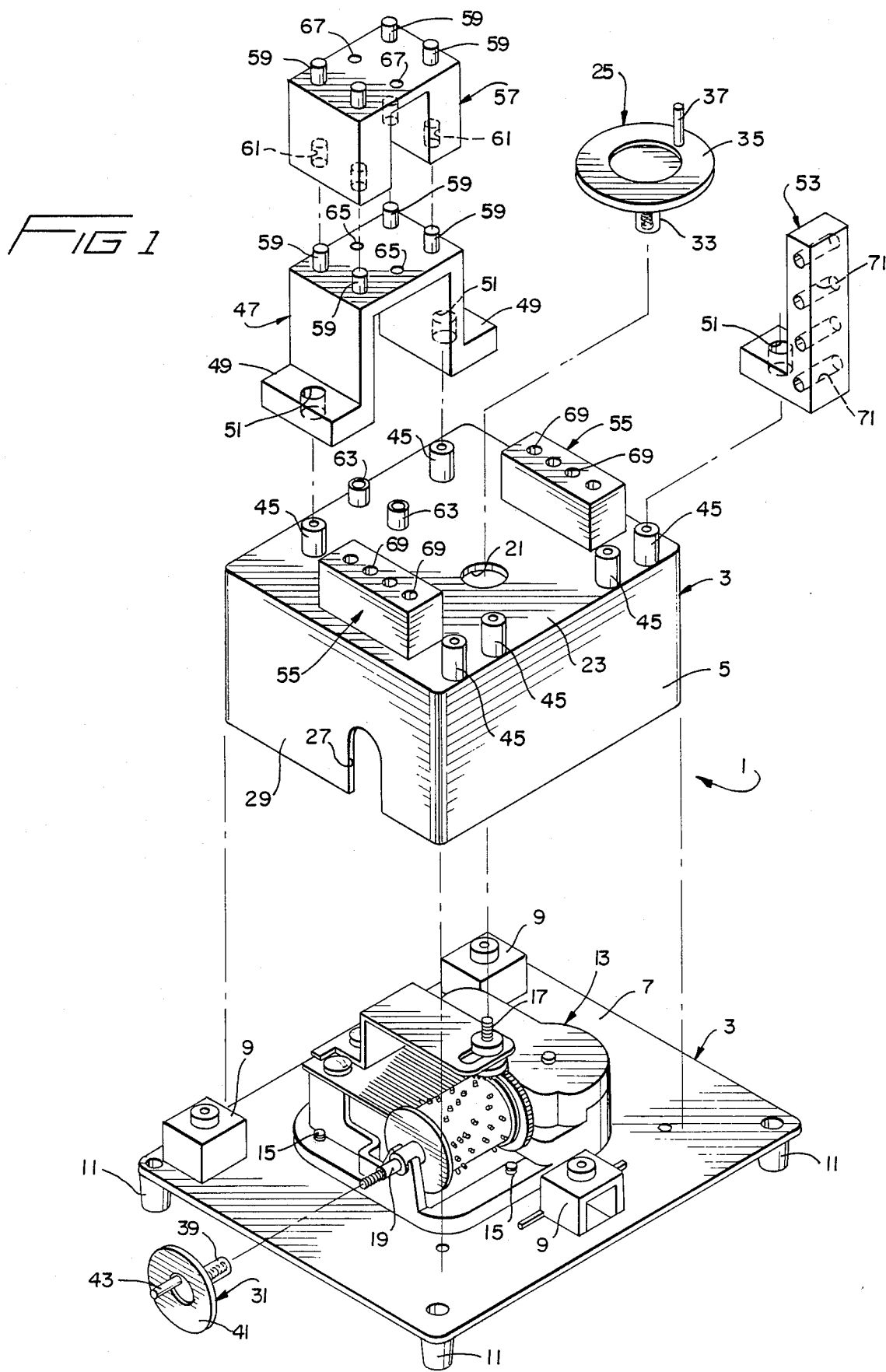
FIG. 1 is an exploded perspective view of an apparatus according to a preferred embodiment of the invention.

An apparatus 1 according to a preferred embodiment of the invention shall be described with initial reference to FIG. 1. As shown therein, apparatus 1 includes a housing structure 3 formed by a rectangular casing 5 and an associated base 7. Casing 5 may be secured to base 7 by a plurality of spaced blocks 9 carried by base 7, or by any other appropriate means well known in the art. Base 7 may also be provided with a plurality of feet 11 for supporting base 7 in a raised position. A conventional power drive source 13 is secured to the upper surface of base 7 by a plurality of screws 15 or other suitable fastening means. Drive source 13 is depicted as a wind-up music box, but may also be in the form of an electric motor or other such suitable device. Drive source 13 is preferably provided with a first threaded power output shaft 17 disposed for rotation about a vertical axis and a second threaded power output shaft 19 disposed for rotation about a horizontal axis, wherein the axes of rotation are offset by 90°.

Casing 5 is provided with a first aperture 21 in an upper wall 23 through which a first cam assembly 25 may be connected to first output shaft 17. Similarly, a second aperture 27 is provided in a side wall 29 of casing 5 through which a second cam assembly 31 may be connected to second output shaft 19. Cam assembly 25 includes internally threaded stub 33 for engagement with a corresponding threaded first output shaft 17, a cam wheel 35 and an outwardly extending cam element 37 eccentrically positioned on wheel 35. Similarly, second cam assembly 31 includes a corresponding internally threaded stub 39 for engagement with threaded second output shaft 19, a cam wheel 41 and an outwardly extending cam element 43 eccentrically positioned on wheel 41. Thus, when casing 5 is assembled on base 7, and first and second cam assemblies 25 and 31 are threadedly engaged onto their respective first and second output shafts 17 and 19, cam wheels 35 and 41 are positioned exteriorly of casing 3.

Upper wall 23 of casing 3 is provided with a plurality of vertically extending cylindrical stubs 45 for detachably securing a first U-shaped block 47 thereto. This is accomplished by providing block 47 with a pair of outwardly extending flanges 49, with each flange 49 being also provided with a cylindrical passageway 51 therethrough. Each passageway 51 is configured and sized for frictionally receiving a corresponding stub 45 therethrough to securely attach block 47 to casing 3. In addition to block 47, and L-shaped block 53 may also be detachably secured to a selected stub 45 by providing a corresponding passageway 51 in one leg of block 53. As also seen in FIG. 1, there are provided a pair of rectangular-shaped blocks 55 which are secured to upper surface 23 on opposite sides of first aperture 21. Though it is preferred that blocks 55 be permanently attached to surface 23, it is understood that they may also be provided with appropriately configured and sized passageways therein for detachable engagement with other selectively positioned stubs 45 in a manner similar to that described for blocks 47 and 53. As furthermore shown, first U-shaped block 47 may be provided with a second U-shaped block 57 detachably engageable therewith by means of a plurality of cylindrical pegs 59 carried by block 47 which are frictionally engaged within a plurality of corresponding recesses 61 formed in block 57. Moreover, block 57 may be provided with a plurality of pegs 59 so that one or more additional blocks 57 may be engaged together on block 47 in a vertically stacked manner.

As also shown in FIG. 1, upper wall 23 is provided with a pair of sockets 63 which are correspondingly sized and positioned in axial alignment with a pair of through holes 65 in first U-shaped block 47 and a pair of through holes 67 in second U-shaped block 57. Similarly, each rectangular-shaped block 55 is provided with a plurality of linearly aligned cylindrical recesses 69 therein, and L-shaped block 53 is provided with a plurality of linearly aligned cylindrical bores 71 therethrough. Each socket 63, hole 65, hole 67, recess 69 and bore 71 has the same diameter for slidably and rotatably receiving a cylindrical straight tappet rod 73 or a cylindrical L-shaped tappet rod 75, as shown in FIG. 2.

In the configuration of apparatus 1 depicted in FIG. 2, tappet rod 73 is vertically supported on upper wall 23 of casing 3 by disposing one end within inwardly positioned socket 63 so that rod 73 extends through corresponding inwardly positioned holes 65 and 67 in blocks 47 and 57, respectively, so that a free end 77 of rod 73 may be used to support an ornament (not shown) thereon. Additional blocks 57 may be used to support longer extensions of rod 73, depending on the desired application of apparatus 1. Rod 73 is provided with a slotted cam follower arm 79 disposed in engagement with cam element 37 of first cam assembly 25 so that rotation of assembly 25 causes oscillation of rod 73, which in turn imparts a corresponding movement to an ornament attached to free end 77 thereof.

L-shaped tappet rod 75 is rotatably journalled through a pair of corresponding L-shaped blocks 53 attached to a corresponding pair of stubs 45 on upper wall 23 in downwardly extending positions. This is realized by passing rod 75 through a pair of axially aligned bores 71 in blocks 53, thereby exposing a free end 81 of rod 75 for attachment to an ornament (not shown). The other end of rod 75 is provided with a slotted cam follower arm 79 which is disposed in engagement with cam element 43 of second cam assembly 31. As is apparent, rotation of assembly 31 results in the oscillation of rod 75, which in turn imparts a corresponding movement to an ornament attached to free end 81 thereof.

The configuration of apparatus 1 shown in FIG. 2 permits the attachment of two ornaments for oscillatory movement of each ornament by tappet rods 73 and 75. This configuration does not require the use of rectangular shaped blocks 55, the use of which shall now be described with reference to another configuration of apparatus 1 as shown in FIG. 3. In this configuration, a straight tappet rod 73 is rotatably supported at one end within a selected bore 69 in each block 55. Each rod 73 is also provided with a corresponding slotted cam follower arm 79 disposed in engagement with first cam element 37. This configuration further includes a third straight tappet rod 73 supported through outwardly positioned hole 67 of first U-shaped block 47 and provided with a cam follower arm 79 that is also engaged with cam element 37. As is apparent, rotation of first cam assembly 25 will produce corresponding oscillatory motions to the three rod 73, each of which may support an ornament on its corresponding free end 77. This configuration also includes a single L-shaped block 53 which is supported in an upwardly extending position on upper wall 23. A shorter L-shaped tappet rod 75 is rotatable journalled through block 53 for oscillation by an associated cam follower arm 79 in the same basic manner previously described for the configuration of FIG. 2. Therefore, the configuration of FIG. 3 is capable of providing movements to four separate ornaments.

Figure 4:
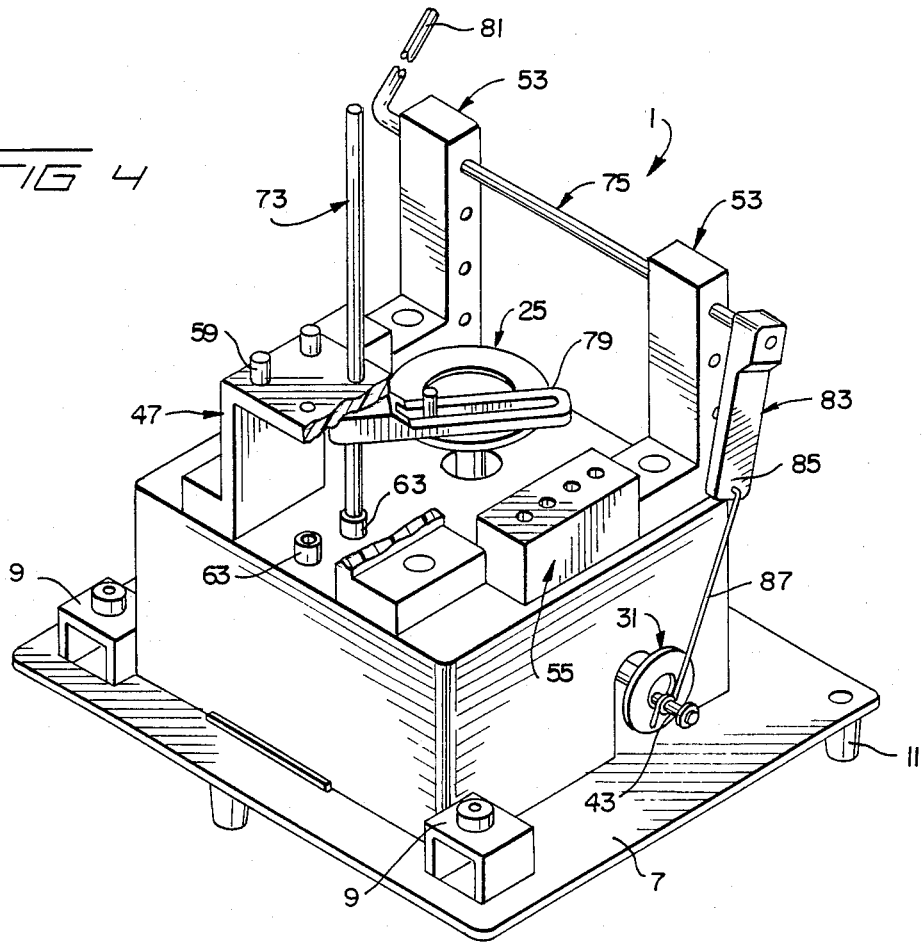
FIG. 4 a perspective view, partly broken away, showing a further possible assembled configuration of the apparatus of FIG. 1 wherein a single straight tappet rod and a single L-shaped tappet rod are driven by two different forms of the cam follower arm.
Figure 5:
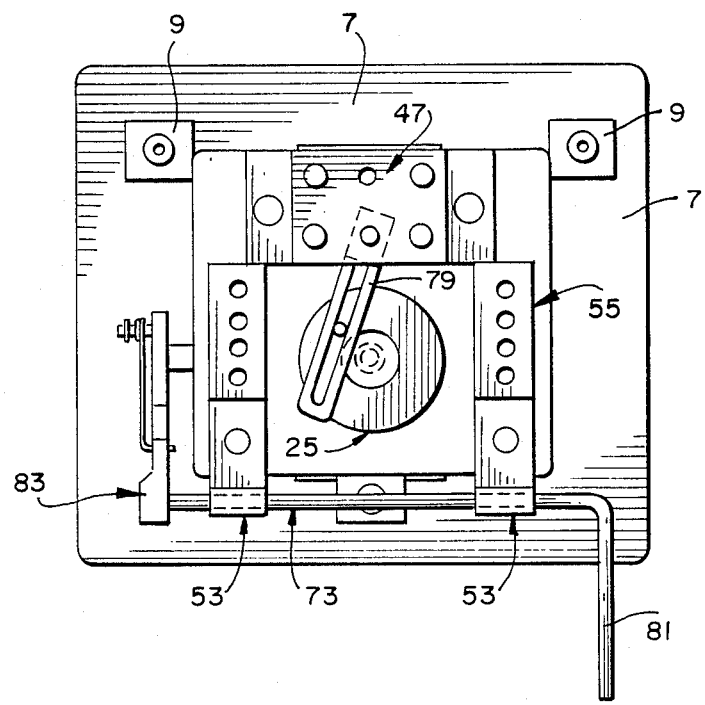
FIG. 5 is a top plan view of the apparatus shown in FIG. 4, but not depicted partly broken away.

A further configuration of apparatus 1 is shown in FIGS. 4 and 5. In this configuration, a pair of L-shaped blocks 53 are supported on their respective stubs 45 in an upwardly extending position for rotatably journalling an L-shaped tappet rod 75 therebetween. This arrangement is of course, the opposite of that depicted for block 53 of FIG. 2. A single straight tappet rod 73 is also provided in forwardly disposed socket 63 and supported through forwardly disposed hole 67 of first U-shaped block 47. Rod 73 is driven by first cam assembly 25 by means of slotted cam follower arm 79 carried by rod 73 and disposed in engagement with cam element 37. However, rod 75 is driven by second cam assembly 31 by means of a cam follower arm 83 that comprises a first arm portion 85 secured to an end of rod 75 and a second arm portion 87 in the form of a length of wire which is pivotally connected at its opposite ends to arm portion 85 and cam element 43. Rotation of cam assembly 31 produces a corresponding oscillatory movement to rod 75 through follower arm 83 in the same manner as that realized by follower arm 79 of the configuration shown in FIG. 2. Thus, the configuration of FIGS. 4 and 5 also permits the attachment and movement of two ornaments, but in this case the ornament supported by rod 75 is disposed in a higher position than that of the FIG. 2 configuration.

Figure 6:
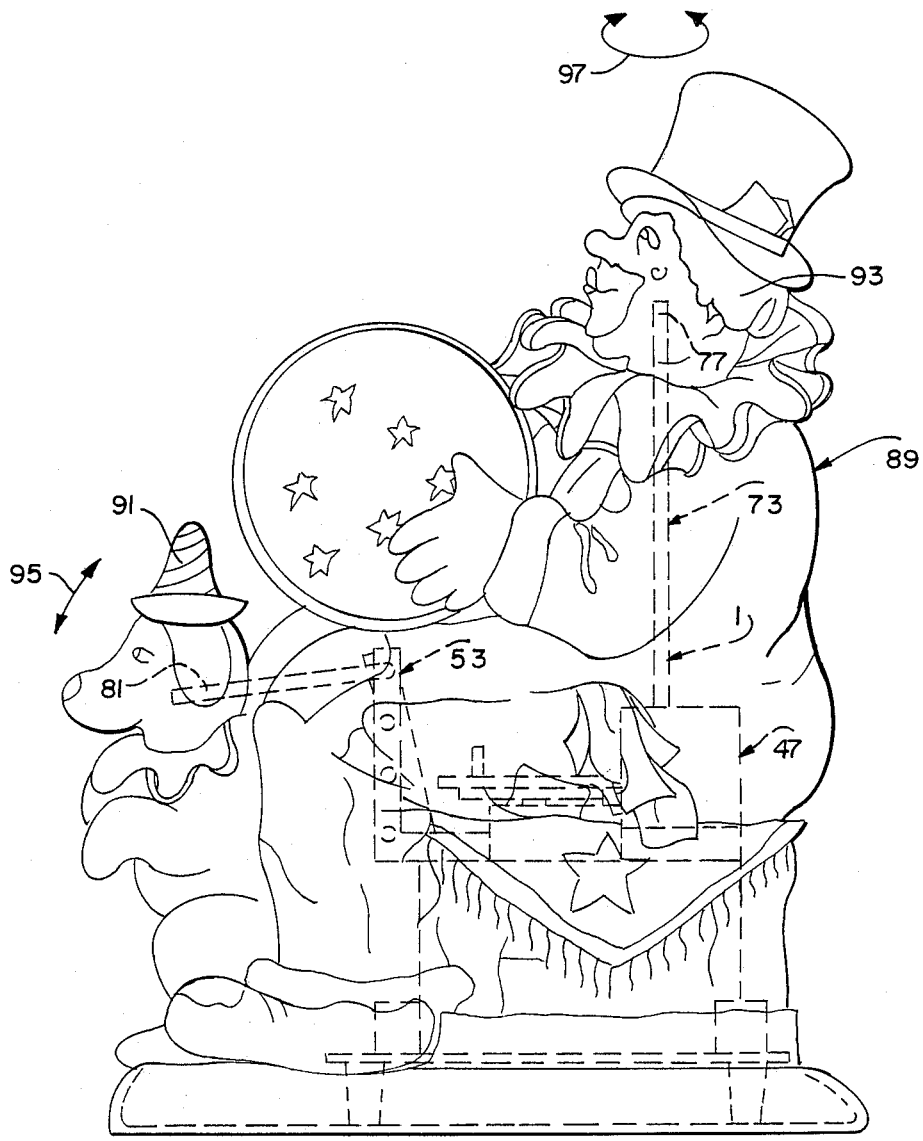
FIG. 6 is a front elevational view of an ornamental assembly including two separate ornaments being driven by the apparatus shown in FIGS. 4 and 5, with the apparatus being generally depicted in dotted lines and incorporated within the ornamental assembly.

An example of the way in which apparatus 1 may be utilized to provide animated movements to plural ornaments of an ornamental device is shown in FIG. 6. In this example, it is apparent that the configuration of apparatus 1 as depicted in FIGS. 4 and 5 is utilized, wherein apparatus 1 is concealed within an ornamental device 89 that includes a pair of moveable ornaments 91 and 93. As shown therein, ornament 91 is attached to end 81 of L-shaped tappet rod 75 which is journalled through L-shaped blocks 53 for oscillatory movement about a horizontal axis. This in turn imparts a corresponding oscillatory movement to end 81 of rod 75 in the opposite directions indicated by arrow 95. As such, end 81 of rod 75 essentially describes an arc that is encompassed within a vertical plane disposed perpendicular to the longitudinal axis of rod 75 supported between spaced blocks 53. As also indicated, ornament 93 is attached to end 77 of straight tappet rod 73, the latter being disposed vertically and caused to be oscillated about its longitudinal axis. This in turn imparts an oscillating movement to ornament 93 in the opposite directions as indicated by arrow 97, which essentially describes an arc about the vertical axis of rod 73.

It is of course readily apparent that assembly 1 may be constructed in a multitude of different configurations by merely adding or subtracting blocks 47, 53, 55 and 57, and arranging same in different positions on casing 3. Moreover, plural tappet rods 73 and 75 may also be added or subtracted and disposed in different positions, depending on the requirements of the ornamental device within which assembly 1 is to be utilized.

The different components of assembly 1 may advantageously be molded from plastic material, though metal may also be substitute for those parts subjected to constant movement and wear, such as tappet rods 73 and 75, and also cam elements 37 and 43.

It is to be understood that the different forms and configurations of the invention hereinshown and described are to be taken as preferred examples or embodiments thereof, and that various changes in shape, material, size and arrangement of parts may be resorted to without departing from the spirit of the invention of scope of the subjoined claims.

I claim:

1. An apparatus for imparting oscillating movement to an ornament from the rotary output shaft of a power drive source comprising:
   (a) a housing assembly including a base and a casing;
   (b) a power drive source supported on the base and enclosed by the casing, the drive source including first and second rotary output shafts, the axes of rotation of the shafts being offset ninety degrees from each other;
   (c) first and second cam assemblies, each cam assembly including a rotatable cam wheel and a cam element carried by the wheel and eccentrically disposed with respect to the wheel axis of rotation, the cam wheel of the first cam assembly being secured to the first rotary output shaft through the casing and the cam wheel of the second cam assembly being secured to the second rotary output shaft through the casing;
   (d) a tappet rod, one end of the tappet rod being configured for attachment to an ornament, and means for rotatably supporting the tappet rod on the casing for oscillatory movement about its longitudinal axis;
   (e) a cam follower arm carried by the tappet rod and disposed in engagement with one of the cam elements; and
   (f) wherein when the rotary output shaft of the cam element engaged by the tappet rod is rotated by the power drive source, the tappet rod is caused to oscillate and impart a corresponding movement to an ornament attached thereto.

2. The apparatus of claim 1 further including means carried by the base for securing the casing thereto.

3. The apparatus of claim 1 wherein the means supporting the tappet rod on the casing includes:
   (a) at least one socket member carried by the casing for rotatably engaging one end of the rod;
   (b) a first U-shaped block provided with at least one hole for rotatably journalling the rod therethrough; and,
   (c) means for detachably securing the first U-shaped block to the casing.

4. The apparatus of claim 3 further including:
   (a) a second U-shaped block provided with at least one hole for rotatably journalling the rod therethrough; and
   (b) means for detachably securing the second U-shaped block to the first U-shaped block whereby the holes of both blocks are disposed in axial alignment with each other.

5. The apparatus of claim 4 wherein:
   (a) the means for detachably securing the first U-shaped block to the casing includes a pair of outwardly extending flanges carried by the block, each flange being provided with a passageway therethrough, and a pair of stubs carried by the casing for engagement within the passageways; and
   (b) the means for detachably securing the second U-shaped block to the first U-shaped block includes a plurality of recesses formed in the second U-shaped block and a plurality of pegs carried by the first U-shaped block for engagement within the recesses.

6. The apparatus of claim 1 wherein the means supporting the tappet rod on the casing includes:
   (a) at least one rectangular-shaped block; and
   (b) a plurality of bores in the block within which one end of the rod may be selectively and rotatably engaged.

7. The apparatus of claim 1 wherein the means supporting the tappet rod on the casing includes:
   (a) at least one L-shaped block;
   (b) a plurality of bores in the block through which the rod may be selectively and rotatably journalled; and
   (c) means for detachably securing the block to the casing.

8. The apparatus of claim 7 wherein the means for detachably securing the L-shaped block to the casing includes a recess provided in the block, and at least one stub carried by the casing for engagement within the recess.

9. An apparatus for imparting oscillatory movements to a plurality of ornaments comprising:
   (a) a housing assembly including a base and a casing;
   (b) a power drive source supported on the base and enclosed by the casing, the drive source including a pair of output shafts for rotatably transmitting the power output of the drive source through the casing, the axes of rotation of the output shafts being offset from each other by 90°;
   (c) a cam assembly driven by each output shaft, each cam assembly including a cam wheel and an eccentrically positioned cam element, the cam assemblies being disposed exteriorly of the housing;
   (d) a plurality of tappet rods;

(e) means supporting the rods on the casing for oscillatory movement about their longitudinal axes; and (f) a cam follower arm carried by each tappet rod and disposed in driving engagement with one of the cam elements.

10. The apparatus of claim 9 wherein the means supporting the tappet rods on the casing includes at least one U-shaped block, one rectangular-shaped block and one L-shaped block, and means for detachably and selectively securing each block to the casing in any one of plural configurations.

* * * * *